United States Patent [19]
Yamanaka

[11] Patent Number: 4,630,103
[45] Date of Patent: Dec. 16, 1986

[54] BLANKING SIGNAL MIXING CIRCUIT

[75] Inventor: Junichi Yamanaka, Sagamihara, Japan

[73] Assignee: Kabushiki Kaisha Toshiba, Tokyo, Japan

[21] Appl. No.: 638,571

[22] Filed: Aug. 7, 1984

[30] Foreign Application Priority Data

Oct. 17, 1983 [JP] Japan ............................ 58-159322[U]

[51] Int. Cl.$^4$ ............................................. H04N 9/67
[52] U.S. Cl. ........................................ 358/33; 358/30; 358/17
[58] Field of Search .............................. 358/17, 30, 33

[56] References Cited

U.S. PATENT DOCUMENTS

| | | | |
|---|---|---|---|
| 4,458,263 | 7/1984 | Schutte | 358/30 |
| 4,481,529 | 11/1984 | Kerling | 358/30 |

OTHER PUBLICATIONS

"Color-Television" pp. 362–366, Section 5.5.12 Process Amplifier, published in 1961 by Nippon Hoso Kyokai.

Primary Examiner—Michael A. Masinick
Attorney, Agent, or Firm—Finnegan, Henderson Farabow, Garrett & Dunner

[57] ABSTRACT

A blanking signal mixing circuit for mixing blanking signals in each of a plurality of picture signals flowing in parallel includes individual inputs for receiving in parallel picture signals into the mixing circuit, a single switching transistor which controls a common connection between a power source and each of the individual inputs, the single switching transistor being rendered conductive by a blanking signal, and a plurality of diodes which prevent leakage of any of the picture signals into other picture signals through the common connection.

6 Claims, 6 Drawing Figures

BLANKING SIGNAL MIXING CIRCUIT

BACKGROUND OF THE INVENTION

This invention relates to a blanking signal mixing circuit for mixing blanking signals in each of a plurality of picture signals for use in a color television camera, or the like.

DESCRIPTION OF THE PRIOR ART

In a color television camera for ordinary broadcasting, three camera tubes corresponding to the three primary colors, i.e., red, green and blue (which will be hereinafter called "R", "G" and "B", respectively,) generate primary color picture signals.

In the color television camera of the kind referred to above, signal processing such as setting of white and black levels, gamma correction, and the like, is effected, and thereafter both horizontal and vertical blanking signals are mixed with the color signals in a control unit. After this signal processing is completed, the R, G and B signals are converted to composite color signals corresponding to each broadcasting system (e.g., NTSC, PAL, SECAM). In a color coder, addition or subtraction of color signals is made at a predetermined ratio in its matrix circuit for each of the R, G and B picture signals, and the color difference signals between these primary color picture signals and a luminance signal are coded. The blanking signals for simultaneous R, G and B picture signals must coincide with one another in this signal coding.

A conventional method of mixing the blanking signals will now be described with reference to FIG. 1 of the accompanying drawings. The R picture signal from a terminal 1, as shown in FIG. 2(a), is introduced into a mixing circuit 6 for adding the blanking signals. This mixing circuit 6 comprises a buffer amplifier BA, a blanking signal switching circuit including a diode CD1, a switching transistor TR1 and a capacitor C connected serially between the amplifier and ground, and a clipping circuit including transistors TR2 and TR3 connected in parallel between a positive power source +E and a output terminal 5 and a resistor Re connected between the output terminal 5 and a negative power source −E. A node between the switching transistor and the capacitor C is also connected to the negative power source −E. The base of the transistor TR2 is connected to a node c between the amplifier BA and the diode CD1.

In the above circuit a positive blanking signal, such as shown in FIG. 2(b), is applied to the base of the switching transistor TR1 from a terminal 4, and the transistor TR1 becomes conductive. Accordingly, the potential at the output terminal (node c) of the buffer amplifier BA drops, and the blanking signal of a negative polarity is mixed as shown in FIG. 2(c). This signal is applied to the clipping circuit composed of the transistors TR2 and TR3. When the base potential of the transistor TR2 becomes lower than that of the transistor TR3 in this clipping circuit, an output corresponding to the base potential Eb on the transistor TR3 is delivered to the output terminal 5. As a result, the portion of the signal lower than a level represented by the dashed line in FIG. 2(c) is clipped for obtaining the predetermined set-up e, as known in the art, and an output signal having a waveform shown in FIG. 2(d) is produced at the output terminal 5. The G and B signals are applied to the terminals 2 and 3, respectively, and then to mixing circuits 7 and 8, similar to the mixing circuit 6 for the R picture signal, where the blanking signals are likewise mixed and the set-up e is added. The output signals of the mixing circuits 7 and 8 are produced at the output terminals 9 and 10, respectively.

The blanking signal portion of the output signal shown in FIG. 2(d) conventionally has a waveform which is shown in magnification in FIG. 3. The breaking time Tf at the leading edge (left side of FIG. 3) of the blanking signal and the rise time Tr at its trailing edge (right side of FIG. 3) are determined by the switching characteristics of the switching transistor TR1. In other words, the breaking and rising times (Tf, Tr) of the set-up e for each of the color signals R, G and B depend upon the characteristics of the switching transistor TR1 of each of the mixing circuits 6 through 8. If the characteristics of the switching transistors are different, therefore, the breaking time Tf, rise time Tr and pulse width Tw of each picture signal become different from the others. Particularly because the rise time Tr at the trailing edge is directly affected by the characteristic of the switching transistor, the pulse width Tw often becomes different by about 100 nS, and the rise time Tr varies correspondingly.

In case each of the switching transistors has the same characteristics, differences in the breaking time Tf and rise time Tr do not occur. It is difficult if not impossible, however, to produce transistors with precisely the same characteristics by mass production.

For the reason described above, the luminance signal obtained by the matrix circuit (not shown) of each of the R, G and B signals and the blanking signal of the color difference signal are also affected by the difference of the blanking signal of each primary color signal. Let's consider a Q signal of the NTSC system in the color difference signal, for example. In this case, $E_Q = 0.21 E_R - 0.52 E_G + 0.31 E_B$ (where $E_Q$, $E_R$, $E_G$ and $E_B$ represent the picture signal voltages of Q, R, G and B, respectively). It will be assumed, as an example, that the breaking time Tf and rise time Tr of each primary color signal ($E_R$, $E_G$, $E_B$) are equal, and Tw is equal for $E_R$ and $E_B$ but is different from that of $E_G$, as shown in FIGS. 4(a), 4(b) and 4(c). If the output of $E_Q$ corresponding to the rise time portion of FIG. 3 for each of the color signals is considered in this case, a transient such as represented by g in FIG. 4(d) is generated. Since $E_Q$ is a color difference signal and is given by the formula described above, if such a transient is generated at any portion of the blanking signal, this transient becomes a false color difference signal. Such a false color difference signal can be damped by a low-pass filter in a transmission line if its frequency is out of the band of the color difference signal. However, when the frequency of the false color difference signal is within the band of the color difference signal, damping is not sufficient and the false color signal is likely to remain.

Recently, a color broadcasting system using picture signals having a wide band has been proposed in order to obtain higher quality. Since the band of the color difference signal is enlarged in this system, the transient described above occurs within the band of the color difference signal or a band close to it. The luminance signal is also formed by the addition of the R, G and B picture signals besides the color difference signal. This means that any variance in the pulse width Tw changes the rise time Tr of the luminance signal Y ($E_Y = 0$.-

$30E_R+0.59E_G+0.11E_B$), as is obvious from FIGS. 4(b) and 4(e).

Even if the breaking time Tf and rise time Tr do not have any variance among R, G and B picture signals, the transient or the dullness of Tr, such as represented by g and h in FIGS. 4(d) and 4(e), occurs. If variance of Tf and Tr occurs in addition to the variance of Tw, it can be anticipated that the result will be even worse.

Recently, a proposal has been made which stipulates the breaking time and rise time of the blanking signal. In such a case, the dullness of Tr, such as shown in FIG. 4(e), is difficult to control, and a new problem will occur if the rise time and breaking time do not satisfy the stipulated times.

SUMMARY OF THE INVENTION

An object of this invention, therefore, is to improve blanking signal mixing circuits, so that blanking signals added to a plurality of picture signals coincide with one another.

Another object of this invention is to improve blanking signal mixing circuits for providing blanking signals which can be added with desired breaking time and rise times.

In order to achieve the above objects of the present invention, a mixing circuit for mixing blanking signals in each of a plurality of parallel picture signals is provided comprising:

a plurality of inputs for receiving each picture signal in parallel into the mixing circuit;

switching means such as a transistor for controlling a common connection between a power source and each of said inputs the switching means being rendered conductive by a blanking signal coordinated with the picture signals; and means for preventing leakage of the picture signals into other picture signals through the common connection.

DESCRIPTION OF THE PREFERRED EMBODIMENTS

Figure 1:
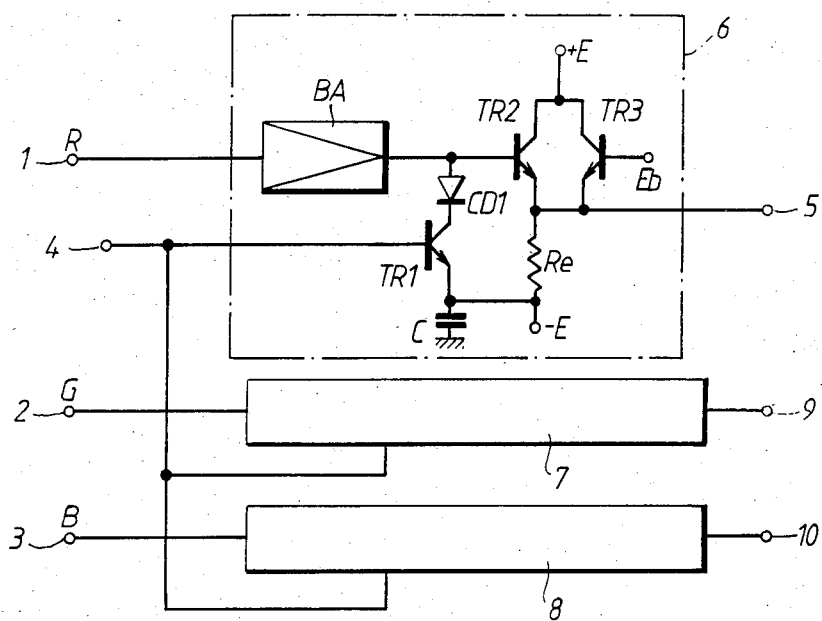
FIG. 1 is a circuit diagram of a conventional blanking signal mixing circuit.
Figure 2:
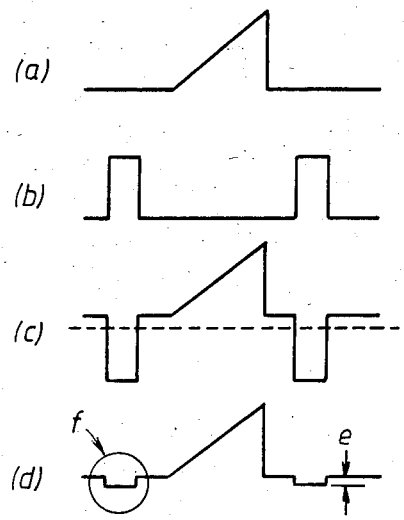
FIG. 2(a) through 2(d) are waveform charts of signals useful for explaining the operation of the circuit shown in FIG. 1.
Figure 3:
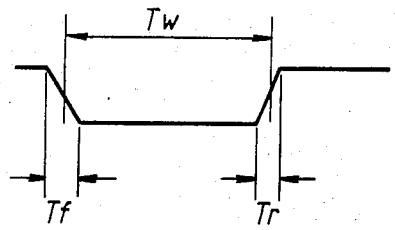
FIG. 3 is a waveform chart showing a part of the waveform shown in FIG. 2(d) in magnification.
Figure 4:
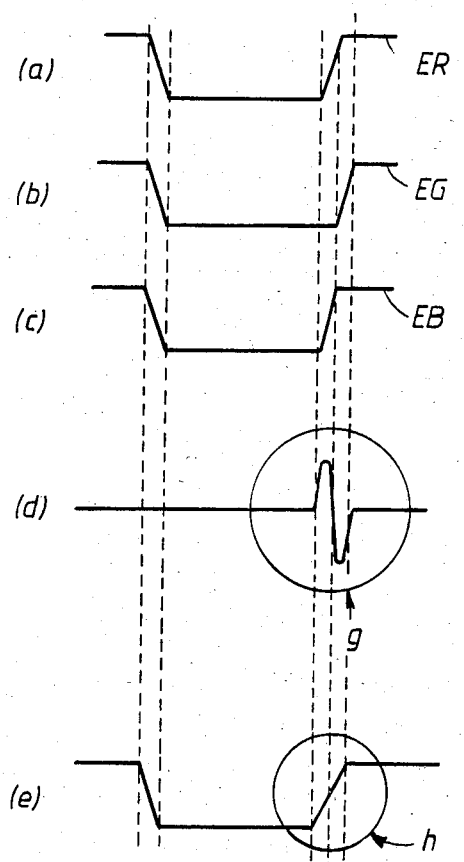
FIG. 4 is a signal waveform chart of the output signal of the circuit shown in FIG. 1 after color signal coding.
Figure 5:
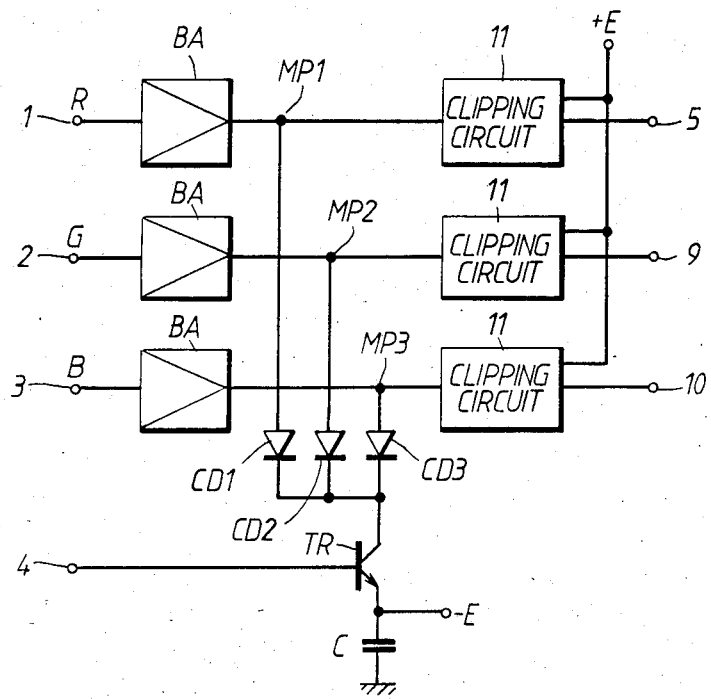
FIG. 5 is a block circuit diagram of a blanking signal mixing circuit in accordance with one embodiment of the present invention and FIG. 6 is a circuit diagram showing another embodiment of the present invention.

Hereinafter, a first embodiment of the present invention will be described with reference to FIG. 5, in which like reference numerals are used to identify like constituents as in FIG. 1.

The R, G and B picture signals are applied to like buffer amplifiers BA, and the outputs of the amplifiers are connected to the anode poles of like diodes CD1, CD2 and CD3 through mixing points MP1, MP2, MP3, respectively. The cathode pole of each diode is connected to the collector of the switching transistor TR. The blanking signal is applied from the terminal 4 to the base of the switching transistor TR. When the blanking signal is applied, the transistor TR becomes conductive and at the same time, the diodes CD1, CD2 and CD3 become simultaneously conductive. Accordingly, the potential at the output of each buffer amplifier BA drops, and the blanking signal is added to each picture signal at the mixing points MP1, MP2, MP3. Reference numeral 11 represents a clipping circuit similar to one shown in FIG. 1, which applies a set-up e to each picture signal.

Since the waveform of the mixing portion of each blanking signal is switched by the single switching transistor TR, the blanking signal to be added to each picture signal has its Tf, Tr and Tw in agreement with those of the other picture signals. Though these Tf, Tr and Tw might otherwise vary slightly depending upon the characteristics of the diodes CD1, CD2 and CD3, no problem occurs in practice so long as high speed switching diodes having a switching speed of from 2 to 5 ns are used as those diodes.

The inclusion of diodes CD1, CD2 and CD3 prevents the leakage of any of the R, G and B picture signals to the others through the mixing points MP1, MP2, MP3 when the switching transistor TR is non-conductive.

A proposal to limit the breaking time and rise time of the blanking signal to be added to each picture signal within a certain range has been proposed, as described already. In this case, a circuit such as shown in FIG. 6 can be used.

Figure 6:
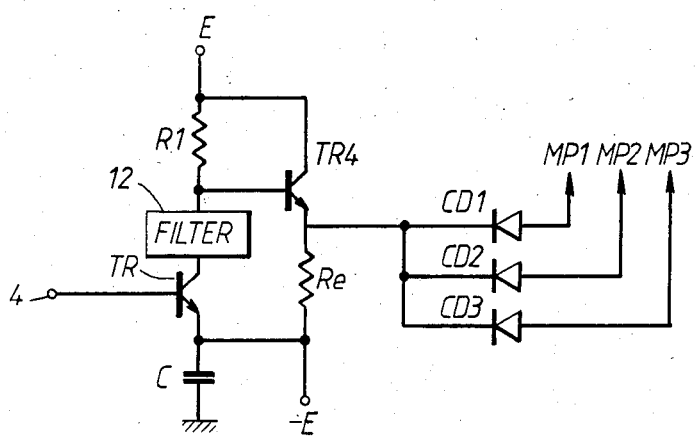

In FIG. 6, an additional transistor TR4 and a filter 12 are connected between the switching transistor TR and diodes CD1, CD2, CD3.

An emitter of the transistor TR4 is connected to cathodes of diodes CD1, CD2, CD3 and to a negative power source $-E$ through a resistor Re.

A collector of transistor TR4 is connected to a positive power source $+E$, and a resistor R1 is connected between the collector and base of the transistor TR4. The filter is connected between the base of the transistor TR4 and a collector of the switching transistor TR.

In the circuit construction shown in FIG. 6, when the blanking signal is applied to the terminal 4, the switching transistor TR becomes conductive. When the supply of the blanking signal is stopped, the switching transistor TR becomes non-conductive, and along therewith, the base potential of the transistor TR4 drops or rises. This potential change is added to each picture signal through the emitter of the transistor TR4 and is mixed as the blanking signal.

In this case, the change of the base potential of the transistor TR4 can be controlled by using a low-pass filter and a band-pass filter for the filter 12 and adjusting its characteristics, and the blanking signal can be added with the desired breaking time and rise time.

What is claimed is:

1. A mixing circuit for mixing a blanking signal with each of a plurality of picture signals applied in parallel to the mixing circuit comprising:

a plurality of input means for receiving said picture signals in parallel;

switching means connected to a common connection between a power source and each of said input means which is rendered conductive by the blanking signal coordinated with said picture signals; and means for preventing leakage of any of said picture signals into other picture signals through said common connection.

2. The mixing circuit as defined in claim 1 wherein said means for preventing leakage includes a plurality of diodes one pole of each diode being connected to one of said input means and the other pole of each diode being connected to said switching means through the common connection.

3. The mixing circuit as defined in claim 1 wherein a filter is connected between said single switching means and said means for preventing leakage.

4. The mixing circuit as defined in claim 1 wherein said switching means is a single transistor.

5. The mixing circuit as defined in claim 2 wherein each of the plurality of input means includes an input terminal and a buffer amplifier.

6. The mixing circuit as defined in claim 1 further including a plurality of clipping circuits each connected respectively to one of said input means and one of said diodes for applying a set-up signal to each of said picture signals.

* * * * *